United States Patent
Wudl et al.

(10) Patent No.: US 7,588,824 B2
(45) Date of Patent: Sep. 15, 2009

(54) HYDROGEN CYANO FULLERENE CONTAINING PROTON CONDUCTING MEMBRANES

(75) Inventors: Fred Wudl, Santa Barbara, CA (US); Galen D. Stucky, Santa Barbara, CA (US); Hengbin Wang, Los Angeles, CA (US); Bruno Jousselme, Antibes (FR); Ken Tasaki, Goleta, CA (US); Arunkumar Venkatesan, Santa Barbara, CA (US)

(73) Assignee: The Regents of the University of California, Oakland, CA (US)

( * ) Notice: Subject to any disclaimer, the term of this patent is extended or adjusted under 35 U.S.C. 154(b) by 688 days.

(21) Appl. No.: 11/067,599

(22) Filed: Feb. 25, 2005

(65) Prior Publication Data

US 2006/0191842 A1   Aug. 31, 2006

(51) Int. Cl.
    *B01J 20/20* (2006.01)
(52) U.S. Cl. .................. 428/368; 429/251; 977/779; 502/4

(58) Field of Classification Search .......... 428/368; 429/251; 502/4; 977/779
See application file for complete search history.

(56) References Cited

U.S. PATENT DOCUMENTS 5,648,523 A     7/1997  Chiang
6,805,985 B2 *  10/2004 Yamada et al. ............. 429/21

OTHER PUBLICATIONS

M. Keshavarz-K et al. Cyanodihydrofullerenes and dicyanodihydrofullerenes: The first polar solid based on C60. J. Am. Chem. Soc., vol. 117, pp. 11371-11372 (1995).
G. Khairallah et al. Identification of cyano dianions of C60 by electryspray mass spectroscopy. Chem. Phys. Lett., vol. 268, pp. 218-222 (1997).

* cited by examiner

*Primary Examiner*—Stuart Hendrickson
(74) *Attorney, Agent, or Firm*—James M. Ritchey

(57) ABSTRACT

The components of and a proton conducting membrane (PCM) produced from a host polymer and an attached or physically blended in hydrogen cyano fullerene proton-source agent, with the physical blending of the host polymer and hydrogen cyano fullerene further promoted by a poly (ethylene oxide) attached fullerene mixing agent.

7 Claims, 13 Drawing Sheets

Multiple PEOC$_{60}$ or C$_{60}${CH$_2$C$_6$H$_4$O(CH$_2$CH$_2$O)$_n$CH$_3$}$_m$

A

B

A

B

A

B

HYDROGEN CYANO FULLERENE CONTAINING PROTON CONDUCTING MEMBRANES

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to novel proton conducting membranes (PCMs) and the components utilized to produce these PCMs. More particularly, the subject invention relates to novel PCMs and their constituent components comprising hydrogen cyano fullerenes ($HC_{60}(CN)_x$ as a proton-source agent and often poly(ethylene oxide) attached fullerenes ($C_{60}(PEO)_y$) as mixing agents to facilitate PCM formation with a host polymer.

2. Description of Related Art

The subject invention is utilized as a major component of a polymer electrolyte fuel cell (PEFC). PEFCs are generally comprised of three major components: the anode; the proton conducting membrane (PCM, the subject invention area); and the cathode. The PCM plays a critical role of transporting a proton from the anode to the cathode. It has to be highly proton conductive and also mechanically, thermally, and chemically stable. Water is produced at the interface between the cathode and the membrane. This water can be problematic, as discussed below, in operation of a PEFC. Lack of suitable membrane availability has been hindering the commercialization of PEFC. Water management is one of the most difficult issues in operating a PEFC. The water in the PEFC is produced as a product at the cathode side in PEFC. A breakdown in water balance between production and loss of water at the cathode side often results in water flood, while the anode interface with the membrane may suffer from water depletion due to water transportation toward the cathode side. Both the flood and the depletion may increase the cell overpotential which results in loss of power. Furthermore, the most commonly used PCMs are based on sulfonated perfluoropolymers that need to be fully humidified to be functional during the operation of the PEFC. Thus, these sulfonated perfluoropolymers not only require a humidifier, but also need an even distribution of water across the membrane which becomes an additional concern because of the membrane's high dependence on water.

Dry operation of PEFC may alleviate some of the water management problems. In fact, there is a strong demand in the auto industry as well as the distributed power generation industry for PEFC functional under low relative humidity (RH) (<50% RH). [Mathias, M.; Gasteiger, H.; Makharia, R.; Kocha, S.; Fuller, T.; Xie, T.; Pisco, J. *Preprints of Symposia—American Chemical Society, Division of Fuel Chemistry* 2004, 49(2), 471-474] Currently, no commercially available PCM meets this demand. NAFION, the industrial standard PCM by DuPont, is widely used in PEFC; yet it is sensitive to humidity, a very undesirable characteristic. Other existing proton conducting membranes, commercially available or under development, are as good or even better than NAFION under fully humidified condition, but very few outperform NAFION under low humidity conditions.

One existing PCM is disulfonated poly(arylene ether sulfone) copolymer (BPSH) developed by McGrath and coworkers. [Wang, F.; Hickner, M.; Kim, Y. S.; Zawodzinski, T. A.; McGrath, J. E. *J. Membr. Sci.* 2002, 197, 231] Though BPSH is thermally stable and mechanically durable, and widely used as one of the most advanced alternative PCM, its proton conductivity under low RH (<80%) is lower than that of NAFION. Lack of membranes capable of functioning under low RH, (i.e., maintaining high conductivity, ~$10^{-1}$ S cm$^{-1}$) has been an obstacle to bringing PEFC to market. The challenge for the industry is how to improve the conductivity of PCMs, where water plays a vital role in proton transportation, under dry condition.

A typical approach previously attempted to improve the conductivity of PCMs under low RH has been to increase the degree of sulfonation in the PCM in an attempt to increase the overall conductivity. [Tchatchoua, C.; Harrison, W.; Einsla, B.; Sankir, M.; Kim, Y. S.; Pivovar, B.; McGrath, J. E., *Preprints of Symposia—Am. Chem. Soc., Div. of Fuel Chem.* 2004, 49(2), 601] The problem with such an approach is that the membrane tends to swell more with a higher degree of sulfonation, which is detrimental in operation of fuel cell since the dimensional stability of the PCM is a key to the operation. Also, there is synthetic difficulty associated with increasing degree of sulfonation. Furthermore, there is a theoretical limit to the conductivity due to the sulfonyl groups (—$SO_3H$) in the membrane.

An existing alternative approach to improve proton conductivity is a fabrication of composite membranes based on the conventional water-based PEM and inorganic/organic additives including $SiO_2$ and heteropolyacids (HPA). [Shao, Z-G.; Joghee, P.; Hsing, I-M. *J. Membr. Sci.* 2004, 229, 43] Especially, HPA has been widely used to improve the performance of proton conducting membranes. [Herring, A. M.; Turner, J. A.; Dec, S. F.; Sweikart, M. A.; Malers, J. L.; Meng, F.; Pern, J.; Horan, J.; Vernon, D. *Abst. 228th Am. Chem. Soc. National Meeting*, Philadelphia, Pa., Aug. 22-26, 2004 FUEL-0053] The problems with HPA, however, are that it is water-soluble, thus leaches out, and the proton conductivity is sensitive to humidity. [Katsoulis, D. E. *Chem. Rev.* 1998, 98, 359] Hence, immobilization of HPA in a membrane is a particularly important issue. [Kim, Y. S.; Wang, F.; Hickner, M.; Zawodzinski, T. A.; McGrath, J. E. *J. Membr. Sci.* 2003, 212, 263]

An existing and more radical approach to improve proton conductivity is to replace water altogether. PCM with low volatile solvents such as imidazole have been utilized to replace water. [Kreuer, K. D.; Fuchs, A.; Ise, M.; Spaeth, Maier, M. J. *Electrochim. Acta* 1998, 43, 1281] Though the proton conductivity of $10^{-2}$ S cm$^{-1}$ has been achieved at high temperatures, imidazole is known to poison the Pt catalyst and also is subject to diffusing out of the membrane, which is currently fixed through chemical attachment to a host polymer. [Schuster, M. F. H.; Meyer, W. H.; Schuster, M.; Kreuer, K. D. *Chem. Mater.* 2004, 16, 329.] Also, work exists in which a polybenzimidazole membrane was doped by $H_3PO_4$ (PBI/$H_3PO_4$). [Fontanella, J. J.; Wintersgill, M. C.; Wainright, J. S.; Savinell, R. F.; Litt, M. *Electrochimica Acta* 1998, 43, 1289.] Yet, $H_3PO_4$ is known to be leached out by water on the cathode side. Improvement of the performance of a PBI/$H_3PO_4$ membrane has been achieved through the use of polyphosphoric acid, however, the poor performance at low temperature and leaching out of $H_3PO_4$ by water condensation remain unsolved. [Zhang, H.; Chen, R.; Ramanathan, L. S.; Scanlon, E.; Xiao, L.; Choe, E-W.; Benicewicz, B. C. *Prep. Div. Fuel Cehm. Am. Chem. Soc.*, Philadelphia, Pa., Aug. 22-26, 2004, 49, 588.] In another approach to replace water, inorganic solid acids such as $CsHSO_4$ have been used. [Haile, S. M.; Boysen, D. A.; Chisholm, C. R. I.; Merle, R. B. *Nature (London, United Kingdom)* 2001, 410, 910.] However, there are concerns regarding this solid acid: reduction of the sulfur in the $CsHSO_4$ electrolyte may occur over time, the reaction with hydrogen forms hydrogen sulfide, and also a poisoning to the Pt catalyst may occur. Other solid acids may be less problematic, but the stability of the materials remain problematic since the operation temperatures for these solid acids are close to their thermal decomposition temperatures. Thus, anhydrous (non-water) membranes have not reached a practical stage for operation of PEFC.

Although limited details are provided, a journal article by Saab et al. provides the first limited experimental data on the ionic conductivity of chemically functionalized fullerene. [Saab, A. P.; Stucky, G. D.; Passerini, S.; Smyrl, W, H, *Fullerene Science and Technology*, 1998, 6, 227.]

U.S. Pat. No. 6,495,290 B1 discloses proton conducting materials composed of carbon materials including fullerenes with functional groups attached to them. [Hinokuma, K., Ata, M., J. Electrochem. Soc. 150 (2003) A112.] It is claimed that the '290 materials can be used for PCM under dry condition. The best conductivity achieved using their materials under dry condition was $10^{-4}$ S cm$^{-1}$, not very high for operation of a PEFC. The difference from the current subject invention is that: (i) the subject invention's performance is much higher, ~$10^{-2}$ S cm$^{-1}$, than theirs, though the subject invention PCM also uses different fullerene-based materials; (ii) their materials lose performance as the content of their fullerenes in the PCM decreases below 80 wt %, while the subject invention PCM exhibits high performances with only 20 wt % of the subject novel fullerenes in a host polymer; and (iii) the subject invention functional groups attached to the fullerenes are completely different from those listed, suggested, or taught in '290. Furthermore, the '290 approach is to use fullerene as a carrier of proton hopping sites such as the OH groups for proton transportation where a proton is transported between the functional groups attached to fullerene. On the contrary, the subject invention uses novel fullerene derivatives as strong proton sources, i.e., the function in the subject invention is different from '290. Thus, a difference is that the '290 invention relies on the functional groups on fullerenes for proton transportation, while the subject invention uses water as the proton transportation medium and the derivatized fullerenes promote proton conduction as a proton-source, especially under low humidity. Additionally, when cyano groups (—CNs) are mentioned in '290 the cyano groups are considered to be only "electron attractive groups" that may be "introduced together with" the other listed critical functional groups and only serve to assist the non-cyano functional groups that must be present too.

BRIEF SUMMARY OF THE INVENTION

An object of the present invention is to describe a PCM having carbon clusters modified with both hydrogen and cyano moieties.

Another object of the present invention is to present a PCM with one component a hydrogen and cyano derivatized fullerene.

An additional object of the present invention is to relate a derivatized carbon cluster mixing agent utilized in producing a PCM by which the mixing agent facilitates blending of a host polymer and a carbon cluster modified with both hydrogen and cyano moieties.

A still further object of the present invention is to disclose a poly(ethylene oxide) derivatized fullerene mixing agent utilized in producing a PCM by which the mixing agent facilitates blending of a host polymer and a hydrogen and cyano derivatized fullerene.

Yet another object of the present invention is to make known a PCM produced by mixing a hydrogen cyano fullerene with a host polymer.

Still yet another object of the present invention is to explain a PCM produced by mixing a hydrogen cyano fullerene proton-source agent, a poly(ethylene oxide) mixing agent, and a host polymer.

Generally, the subject invention comprises a PCM having a host polymer and a proton-source agent. The proton-source agent comprises a carbon cluster derivative, wherein the carbon cluster is derivatized with both hydrogen and cyano moieties. The carbon cluster derivative comprises from about 0.01 wt % to about 80 wt % of the PCM and may be physically blended with the host polymer or attached to the host polymer. Although any suitable carbon cluster (such as a fullerene family member or equivalent molecule such as a carbon nano-tube, open or closed carbon cage-molecule, and the like) that does not interfere with the structural and functional characteristics of the PCM is contemplated to be within the realm of this disclosure. The preferred carbon cluster is usually one of the family of carbon structures known as fullerenes and therefore the carbon cluster derivative usually comprises a hydrogen cyano fullerene.

A host polymer is any polymer utilized to generate a functioning PCM such as poly(ethylene oxide) and the like.

When a carbon cluster derivative is blended with a host polymer, the composition may further comprise a mixing agent to promote blending of the carbon cluster derivative with the host polymer. The subject mixing agent comprises one or more poly(ethylene oxide) side chains attached to a carbon cluster, wherein the carbon cluster preferably comprises a fullerene family member or equivalent molecule such as a carbon nano-tube, open or closed carbon cage-molecule, and the like.

It is noted, in general, that the subject PCMs, comprised of the novel subject components, possess an improved performance over existing PCMs under low humidity, <50% relative humidity (RH), and at high temperature (>120° C.) in the operation of polymer electrolyte fuel cells (PEFC).

Further objects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 shows chemical representations for two specific forms of hydrogen cyano fullerenes, $C_{60}H(CN)$ and $C_{60}H(CN)_3$, the general acid source in the subject invention, wherein a general formula is $C_{60}H(CN)_n$ with "n" running from 1 to about 60.

FIG. 2 shows chemical representations for two specific forms of poly(ethylene oxide), Mono $PEOC_{60}$ and Di $PEOC_{60}$, general mixing agents in the subject invention, wherein a general formula is $C_{60}\{N(CH_2CH_2O)_nCH_3\}_m$ with "n" running from 1 to about 45 or greater and "m" running from 1 to 2 or greater.

FIG. 3 shows a chemical representation for a general mixing agent in the subject invention, wherein the general formula is $C_{60}\{CH_2C_6H_4O(CH_2CH_2O)_n CH_3\}_m$ with "n" running from 1 to about 45 or greater and "m" running from 1 to about 8 or greater.

FIGS. 8A, 8B, and 8C show the IR spectra for $C_{60}$, $C_{60}H(CN)$, and $C_{60}H(CN)_3$, respectively.

Figure 9:
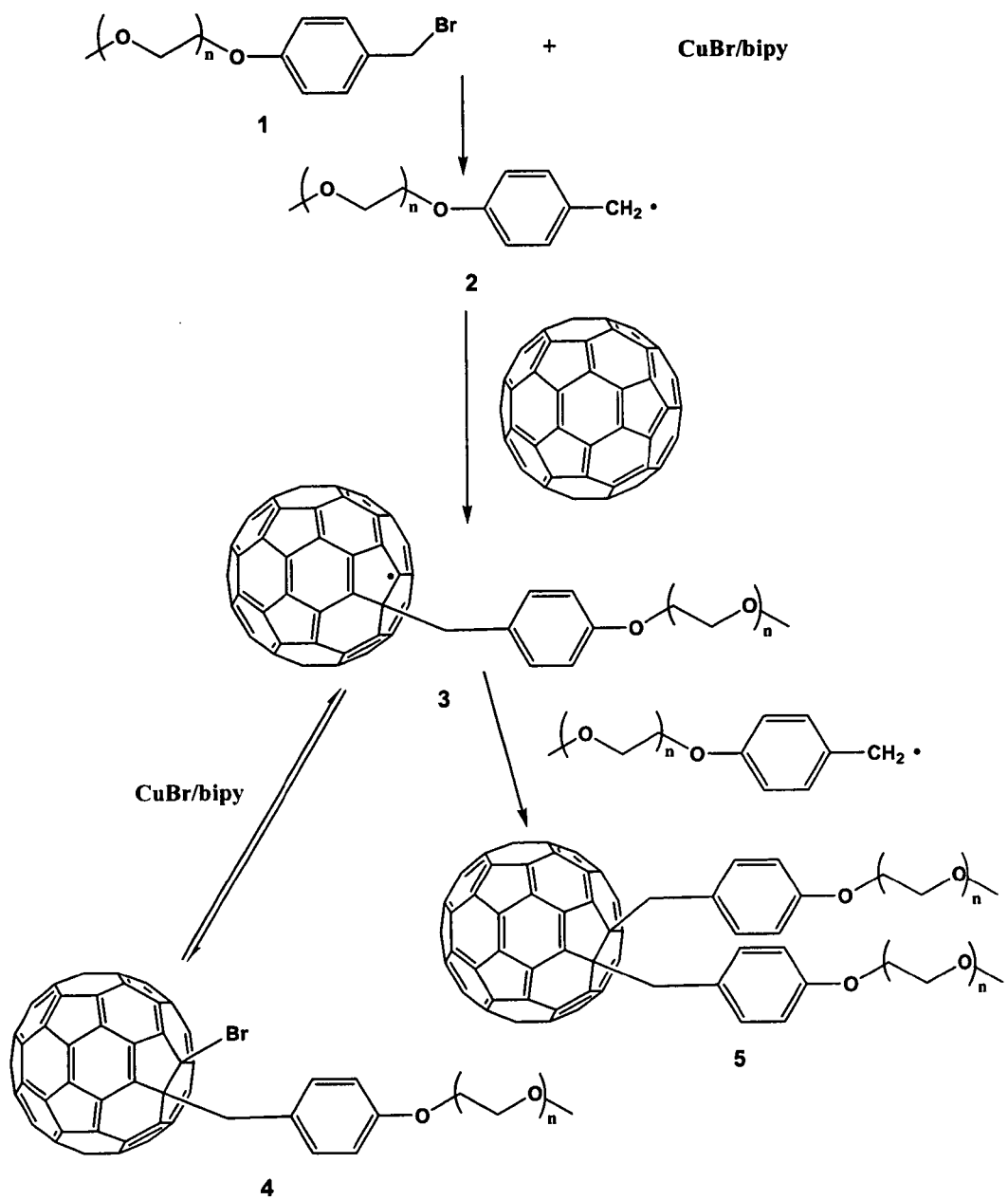

FIG. 9 shows a proposed reaction mechanism for the synthesis of poly(ethylene oxide) attached fullerenes.

Figure 10:
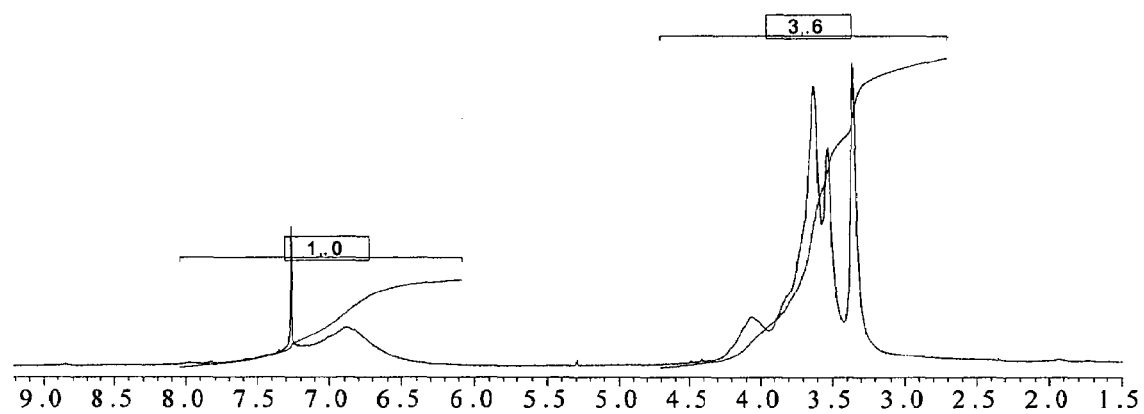

FIG. 10 shows the proton NMR spectrum for multi-PEO fullerenes.

Figure 11:
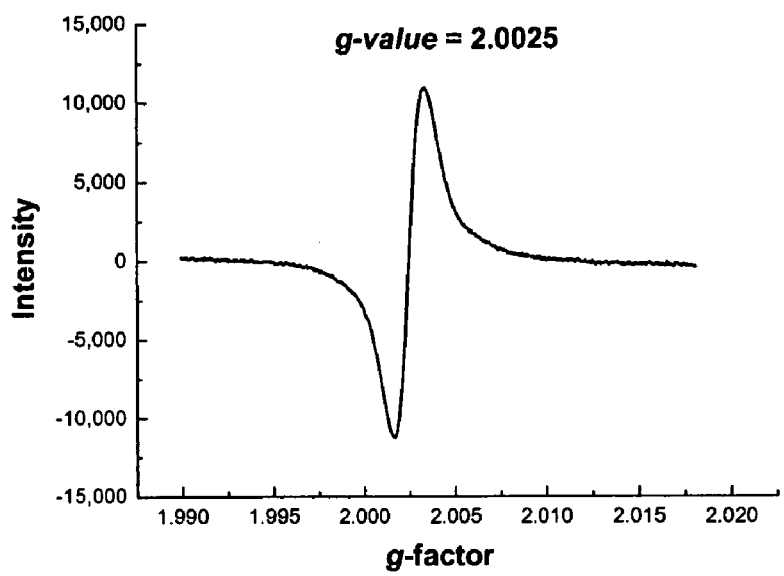
Figure 11:
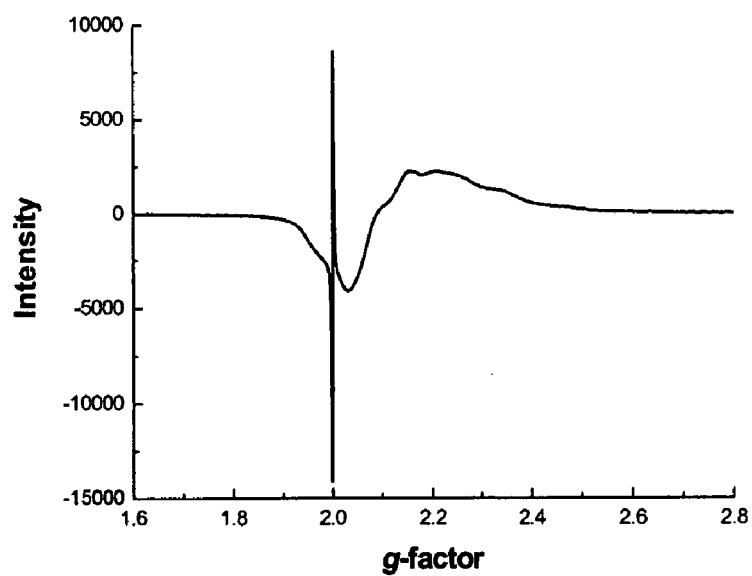

FIGS. 11A and 11B show EPR spectra for organic (11A) and transition metal (11B) radical signals from samples of $(PEO_3)_mC_{60}$.

Figure 12:
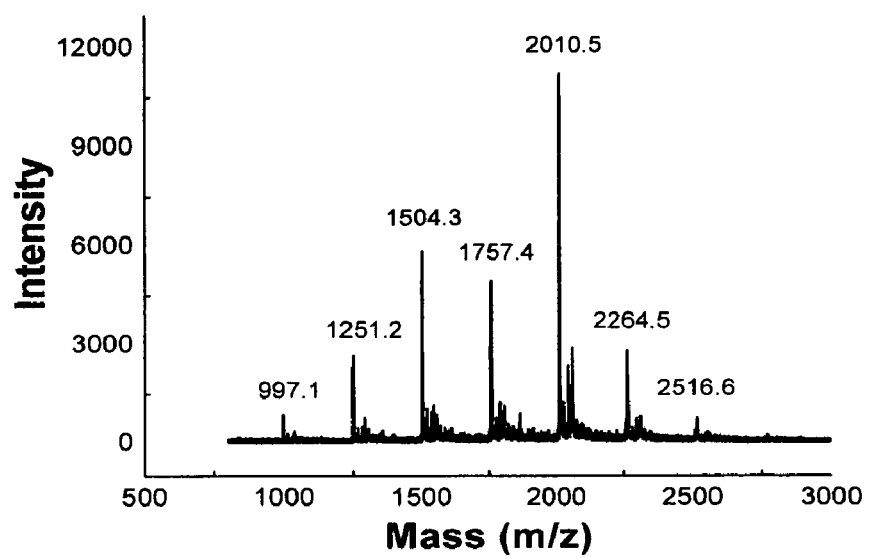
Figure 12:
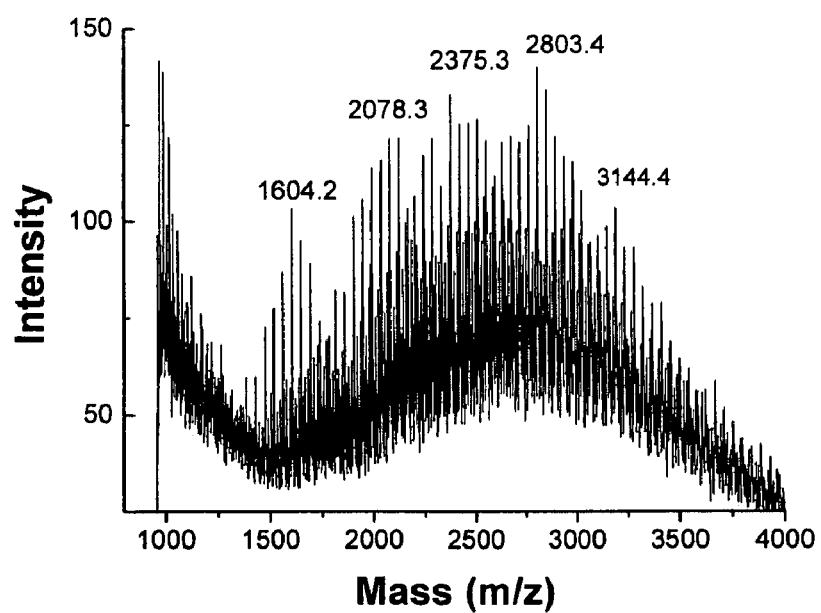

FIGS. 12A and 12B show MALDI-TOF spectra of $(PEO_3)_mC_{60}$, (12A) and $(PEO_8)_mC_{60}$ (12B).

Figure 13:
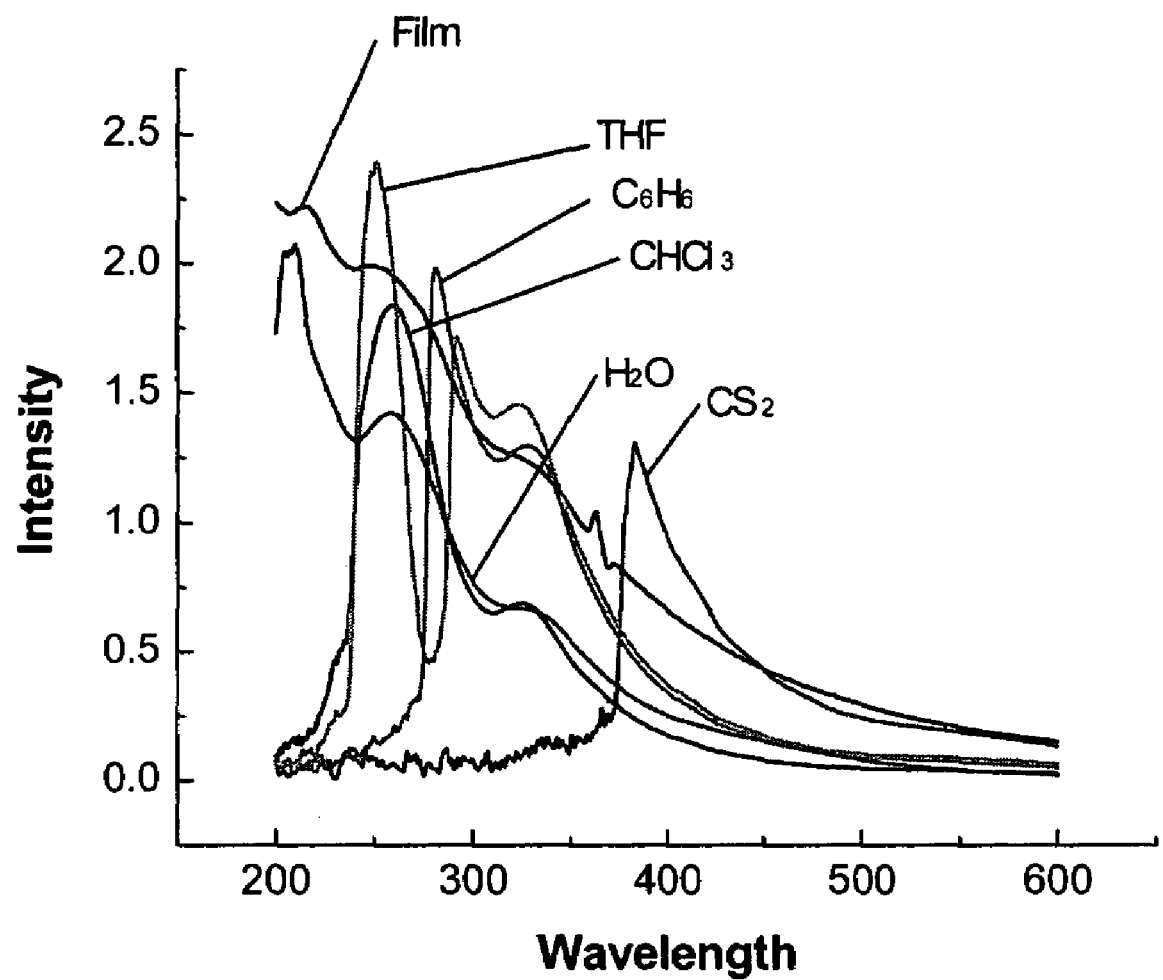

FIG. 13 shows the UV-VIS spectra of Di $(PEO_{16})C_{60}$ in various solvents and thin film.

DETAILED DESCRIPTION OF THE INVENTION

Figure 1:
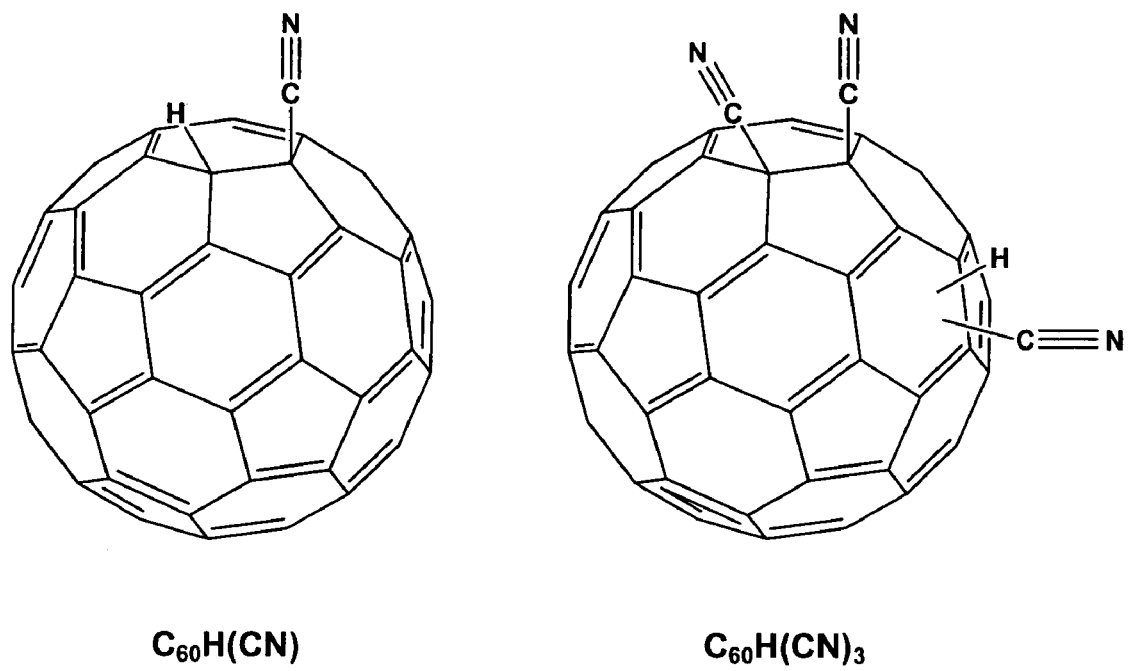
Figure 2:
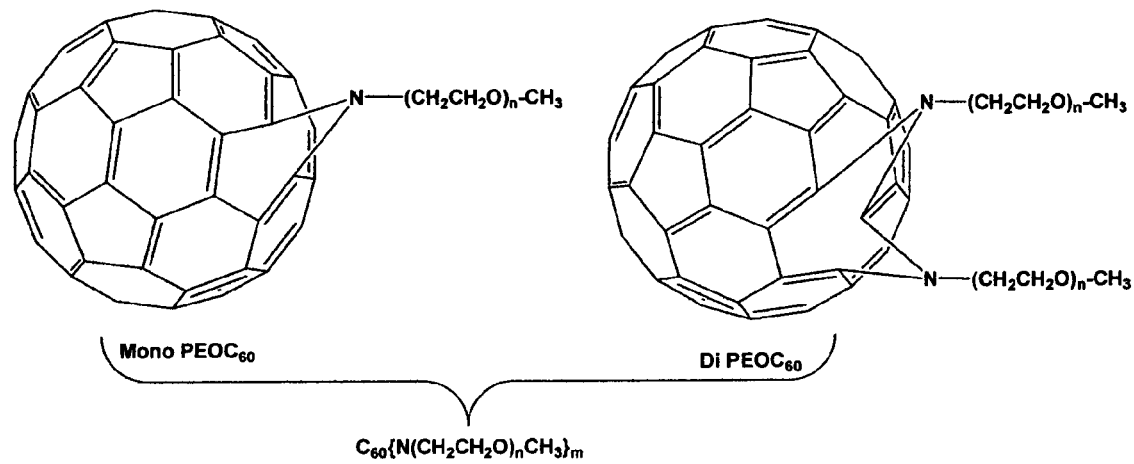
Figure 3:
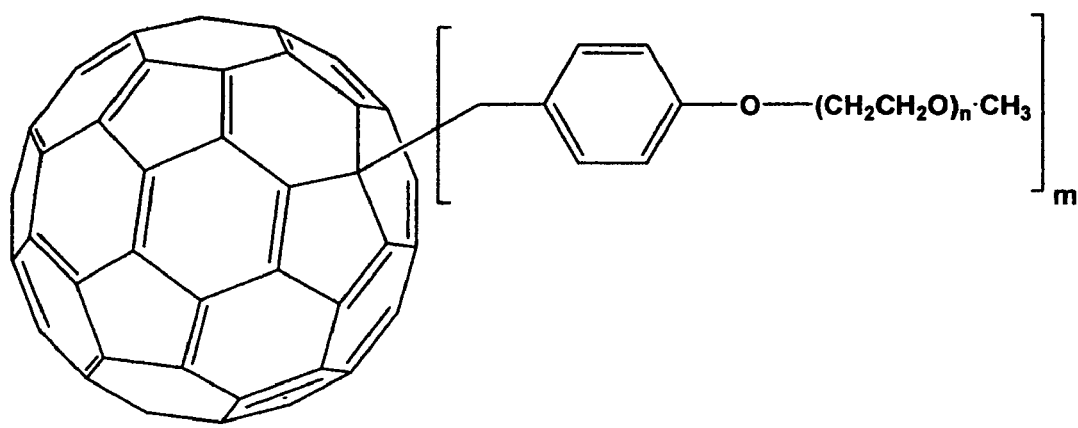

Referring more specifically to the drawings, for illustrative purposes the present invention is embodied in novel proton conducting membranes (PCMs) produced from various suitable combinations of the chemical structures generally shown in or related to those depicted in FIG. 1 through FIG. 3. It will be appreciated that the PCMs may vary as to their exact component percentages, without departing from the basic concepts as disclosed herein.

Generally, the subject invention comprises PCMs having novel proton-source agents and may also contain novel mixing agents that aid in blending the proton-source agents with the host polymer. Contrary to existing PCMs that derive their acidity from weaker acid species like the $SO_3H$ group, a typical acid group found on traditional PCMs (pKa of $C_6H_5SO_3H$ is approximately 2, while the pKa of $C_{60}H(CN)_3$ is approximately 0.7), the subject proton-source agents utilize stronger hydrogen and cyano acid moieties, yet the subject invention still uses water as a proton transportation medium. To facilitate proton conduction in the PCM, novel proton-source agents are employed that comprise hydrogen cyano derivatized carbon clusters that structurally and functionally incorporate into PCMs. Various types of carbon clusters are possible (see U.S. Pat. No. 6,495,290 B1, which is herein incorporated by reference, for a description of some carbon clusters commonly used or that may be used in forming PCMs), however, a preferred embodiment of the subject invention comprises carbon clusters that are specifically hydrogen cyano fullerenes (HCF; see FIG. 1) which are very strong acids. An HCF functions as an acid source in a PCM in which HCF is mixed in a host polymer or host polymer and a mixing agent (see FIGS. 2 and 3). Strong acids result in higher concentrations of protons, the ion carrier in PCM, in general, due to the higher proton dissociation of the acid; thus, the subject HCFs increase overall conductivity of a PCM, lifting conductivity versus relative humidity (RH). Stronger acids can also hold more so-called "bound water" which may be used for proton transportation, especially beneficial under low RH. The importance of bound water in a PCM has been recognized. [Kim, Y. S.; Dong, L.; Hickner, M. A.; Glass, T. E.; Webb, V.; McGrath, J. E. *Macromolecules* 2003, 36, 6281.] This may decrease the slope of found in traditional conductivity vs. RH curves, which lifts the conductivity under low RH relative to that under higher RH.

It is noted that the hydrogen and cyano functional groups may be directly connected to the carbons within the carbon cluster/fullerene or physically displaced from the carbon cluster/fullerene surface by a spacer moiety such as methylene(s) or similar appropriate spacer unit(s).

One should appreciate that the proton-source agent may be directly or indirectly chemically coupled to the host polymer and not merely physically blended with the host polymer. Standard chemical coupling procedures may be utilized to generate such linkages.

Often included in the subject PCMs are mixing agents that promote the blending of the subject HCF in with a host polymer, thus allowing the subject HCFs to be well-dispersed throughout the membrane to achieve the maximum performance as a PCM.

More specifically, the subject invention comprises a hydrogen cyano fullerene acid source/proton-source agent, a host polymer, and, if desired, a poly(ethylene oxide) fullerene mixing agent.

ACID SOURCE/PROTON-SOURCE AGENT—Hydrogen cyano fullerenes—One of the subject materials may be expressed in general form as $C_{60}H(CN)_n$. FIG. 1 illustrates two typical and non-limiting examples, hydrogen mono-cyano fullerene ($C_{60}HCN$) and hydrogen tri-cyano fullerene ($C_{60}H(CN)_3$) (see FIG. 4 for additional examples). It must be stressed that fullerenes come in other forms than the common $C_{60}$ species and that these other fullerenes ($C_{20}$, $C_{70}$, $C_{76}$, $C_{84}$, $C_{86}$, and the like) and equivalent hydrogen cyano derivatives are also within the realm of this disclosure. The composition of HCF in a host polymer can be in an extremely wide range (which differs dramatically from existing acid sources utilized in PCMs), but preferably from about 0.01 wt % to about 80 wt %. Again, HCF can be either blended in the host polymer or chemically attached to it.

Figure 4:
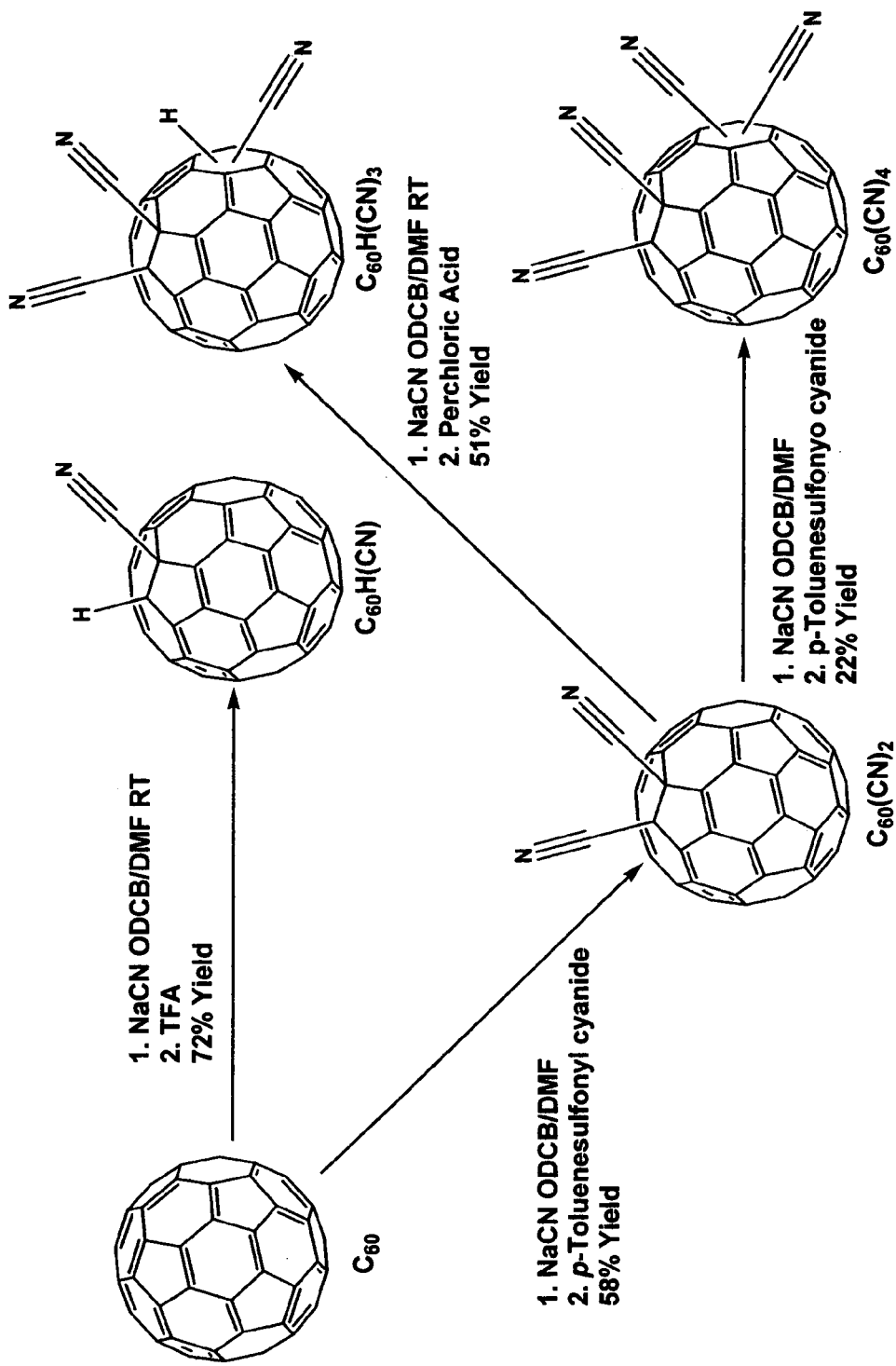
FIG. 4 shows a synthesis scheme for the compounds $C_{60}H(CN)$, $C_{60}H(CN)_3$, $C_{60}(CN)_2$, and $C_{60}(CN)_4$.

The exemplary compounds $C_{60}H(CN)$, $C_{60}H(CN)_3$, $C_{60}(CN)_2$, and $C_{60}(CN)_4$ were synthesized according to the synthesis scheme shown in FIG. 4 (see below in the "Examples" section for details).

MIXING AGENT—Poly(ethylene oxide) attached fullerenes—The mixing agents which promote a blending of the hydrogen cyano fullerenes into a host polymer are comprised of poly(ethylene oxide) attached fullerenes. These materials may be expressed as $C_{60}\{(NCH_2CH_2O)_nCH_3\}_m$ and $C_{60}\{CH_2C_6H_4O(CH_2CH_2O)_nCH_3\}_m$, wherein "n" and "m" range from 1 to about 45 and from 1 to about 8 or greater, respectively. FIGS. 2 and 3 illustrate some non-limiting examples. The actual chemical linkage of the poly(ethylene oxide) moiety to the fullerene may vary as long as the linkage means does not interfere with the proper functioning and structural integrity of the generated PCM. In general, FIG. 2 illustrates nitrogen facilitated linkages to generate mono and di poly(ethylene oxide) derivatives of fullerene (mono- and di-$C_{60}$ poly(ethylene oxide) ($PEOC_{60}$), respectively). FIG. 3 depicts phenyl linkages from multiple poly(ethylene oxide)s to a $C_{60}$ poly(ethylene oxide) ($PEOC_{60}$) core. Again, it is stressed that fullerenes come in other forms than the common $C_{60}$ species and that these other fullerenes ($C_{20}$, $C_{70}$, $C_{76}$, $C_{84}$, $C_{86}$, and the like) and equivalent poly(ethylene oxide) derivatives are also within the realm of this disclosure.

Figure 5:
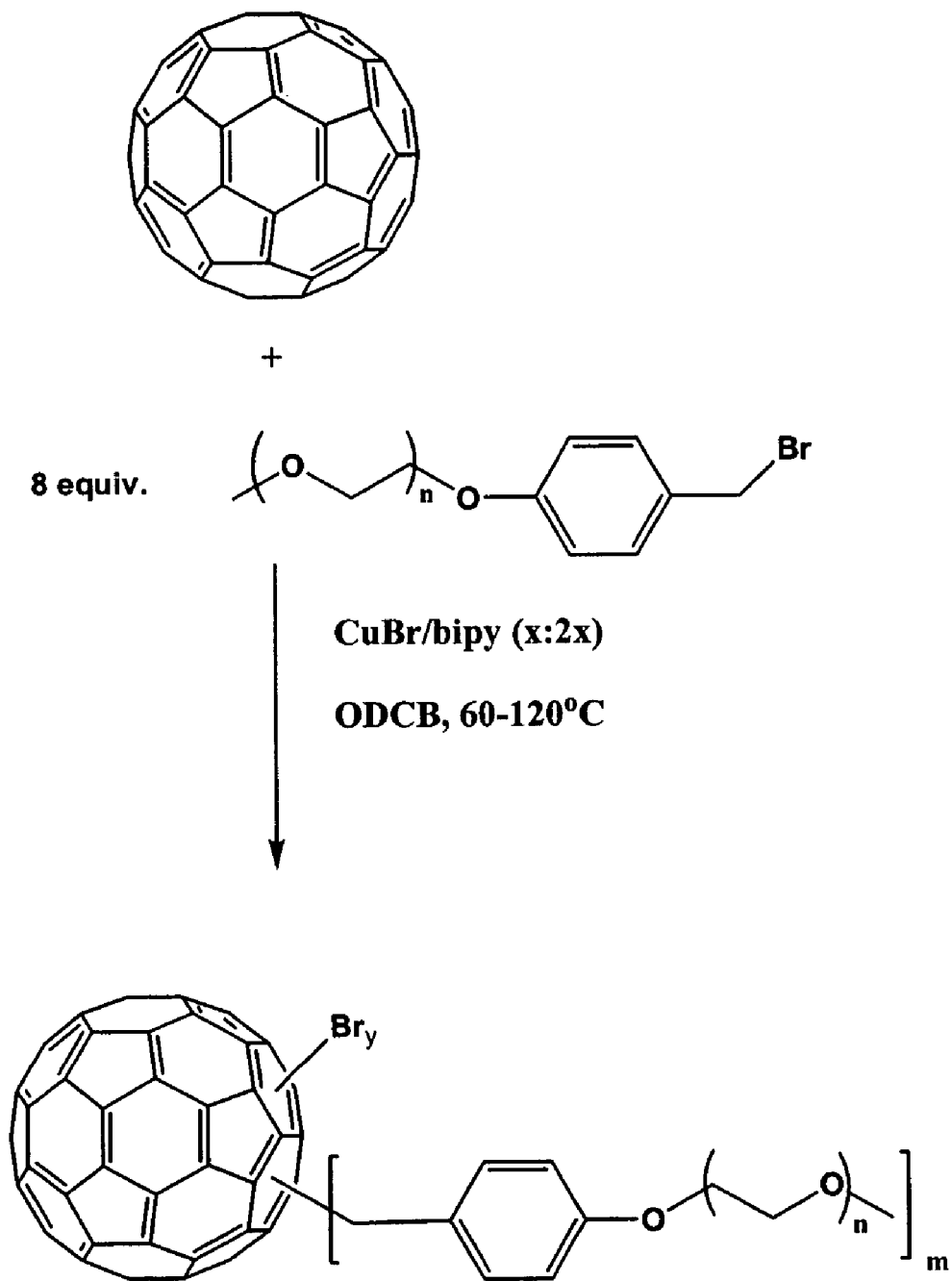
FIG. 5 shows a synthesis scheme for exemplary $C_{60}\{CH_2C_6H_4O(CH_2CH_2O)_nCH_3\}_m$ (multi-PEO fullerene [$PEO_mC_{60}$] derivatives with various length sizes and numbers of $PEO_m$ chains) molecules by atom transfer radical addition (ATRA) reactions.

The exemplary $C_{60}\{CH_2C_6H_4O(CH_2CH_2O)_nCH_3\}_m$ (multi-PEO fullerene [$PEO_mC_{60}$] derivatives with various length sizes and numbers of $PEO_m$ chains) molecules were designed and synthesized by atom transfer radical addition (ATRA) reactions (see FIG. 5). It is noted that apparently a limited amount of bromine is incorporated into the final fullerene compounds (the bromine is not indicated in the FIG. 3 structure since, apparently, it is the $PEO_m$ chains that produce the mixing agent's blending properties and not the small amount of bromine).

Figure 6:
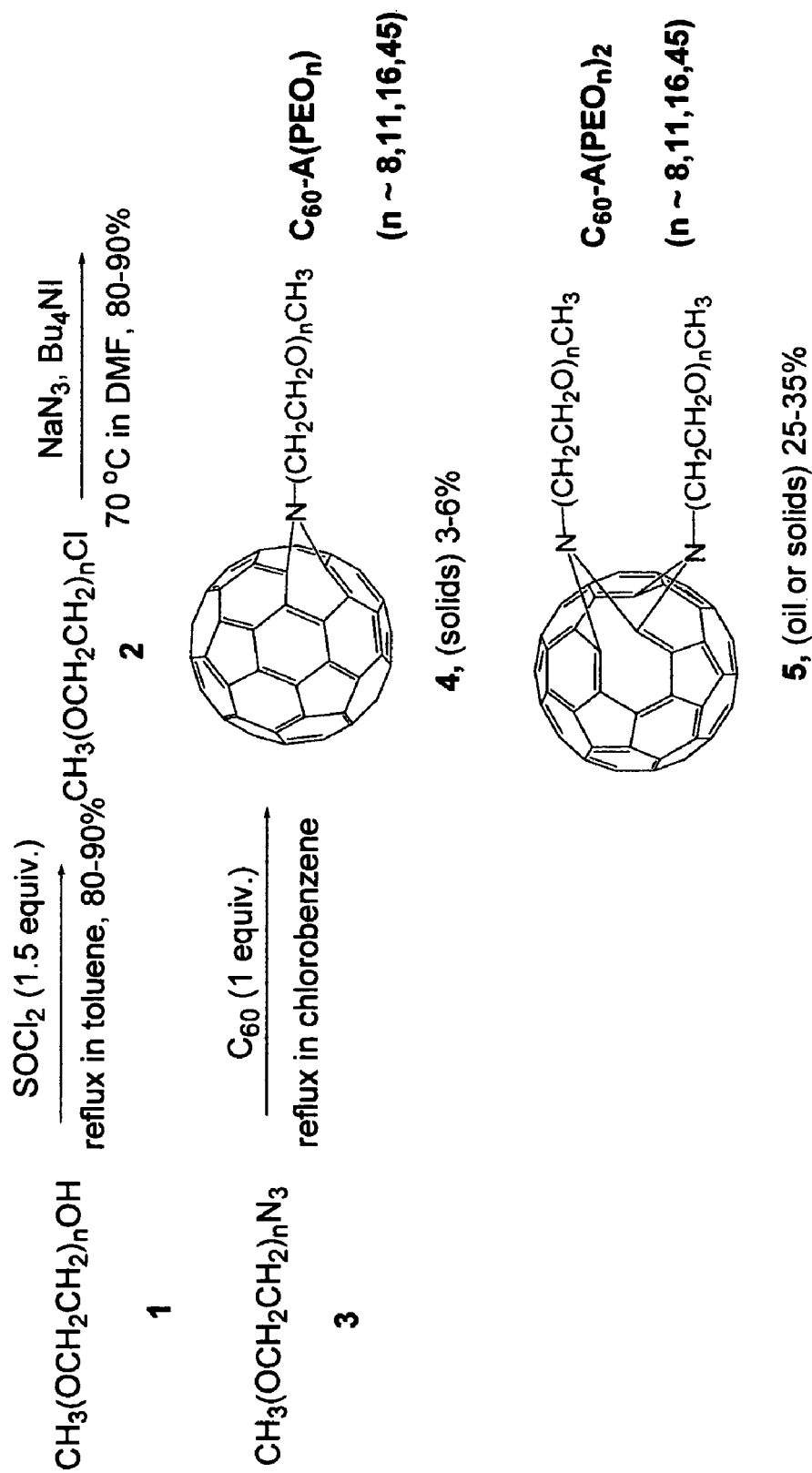
FIG. 6 shows the azide addition of PEO-azide to fullerene synthesis scheme utilized to produce exemplary $C_{60}\{(NCH_2CH_2O)_nCH_3\}_m$ molecules, made with numbers of and various lengths of PEO chains.

The exemplary $C_{60}\{(NCH_2CH_2O)_nCH_3\}_m$ molecules, made with various length of PEO chain, were synthesized by azide addition of PEO-azide to fullerene (as seen in FIG. 6). The synthesis followed the procedure from literature. [Hawker, C. J., Saville, P. M., and White, J. W., *J. Org. Chem.* 1994, 59, 3503 and Huang, X. D., Goh, S. H., and Lee, S. Y., *Macromol. Chem. Phys.* 2000, 201, 2660.] However, unlike those fullerene azide addition reactions, in which mono-azide addition products are always the major products, here we found bis-azide addition products were the major products in all the reactions. Only trace amount of mono-azide addition products were detected (see below for details).

HOST POLYMER—The host polymers in which hydrogen cyano fullerenes (HCF) are mixed (and, if selected, also one or more suitable fullerene derivatized mixing agents) to compose a PCM can be any polymers as long as they are thermally, chemically, and mechanically stable, and durable when mixed with HCF under typical fuel cell operation conditions. They can be either proton conductive or non-conductive. The examples include NAFION (DuPont), poly(arylene ether sulfone), poly(phosphazines), polyethers, poly(vinyl pyrrolidone), poly(phenylene ether), and other equivalent materials.

EXAMPLES

Example 1

Preparation of the Acid Source/Proton-Source Agent (Hydrogen Cyano Fullerenes)

Again, $C_{60}H(CN)$ and $C_{60}(CN)_2$ were synthesized according the literature (Keshavarz, M., Knight, Srdanov, G, and Wudl F., JACS 1995, 11371).

In particular, for the preparation of $C_{60}H(CN)_3$ a degassed solution of NaCN (20 mg, 1.2 eq.) in DMF (20 mL) was added to a degassed solution of $C_{60}(CN)_2$ (260 mg, 0.34 mmol.) in ODCB (30 mL) via canula at room temperature. After being stirred 3 minutes, the resultant deep green solution was treated with percholoric acid (0.25 mL). After 30 minutes, the brown mixture was concentrated and the solid obtained was chromatographed on silica gel ($CS_2$/Toluene (1:3)), $C_{60}H(CN)_3$ was dissolved in ODCB and crystallized by adding ethyl ether or methanol (51% yield). It is noted that during the synthesis of $C_{60}H(CN)_3$, that the acidity of trifluoroacetic acid (pKa 0.52) is not strong enough to protonate the $C_{60}(CN)_3$ and a stronger acid like perchloric acid (pKa: −1.6) was needed to protonate efficiently this anion. This approach made it possible to obtain $C_{60}H(CN)_3$ in a 51% yield (double that obtained from TFA).

For the preparation of $C_{60}(CN)_4$ degassed solution of NaCN (30 mg, 1.2 eq.) in DMF (40 mL) was added to a degassed solution of $C_{60}(CN)_2$ (400 mg, 0.52 mmol.) in ODCB (60 mL) via canula at room temperature under $N_2$. After being stirred 3 minutes, a degassed solution of p-toluenesulfonyl cyanide (189 mg, 2 eq.) in toluene (30 mL) was added via canula to the resultant deep green solution. After 4 hours, the brown mixture was concentrated and the solid obtained was chromatographed on silica gel ($CS_2$/Toluene (1:3)). The solvents were removed and $C_{60}(CN)_4$ was dissolved in ODCB and crystallized by adding ethyl ether or methanol (22% yield).

Figure 7:
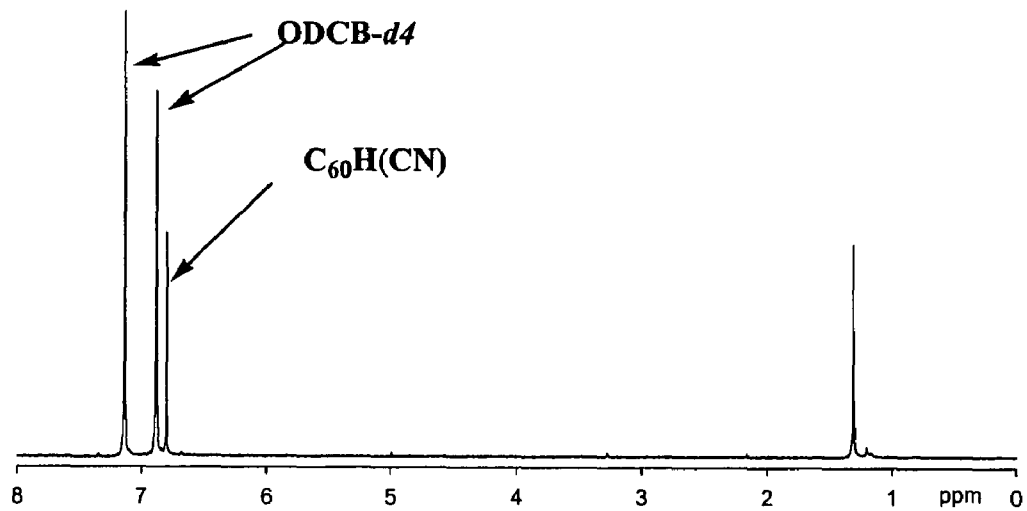
FIG. 7 shows the proton NMR spectra for $C_{60}H(CN)$ and $C_{60}H(CN)_3$.
Figure 7:
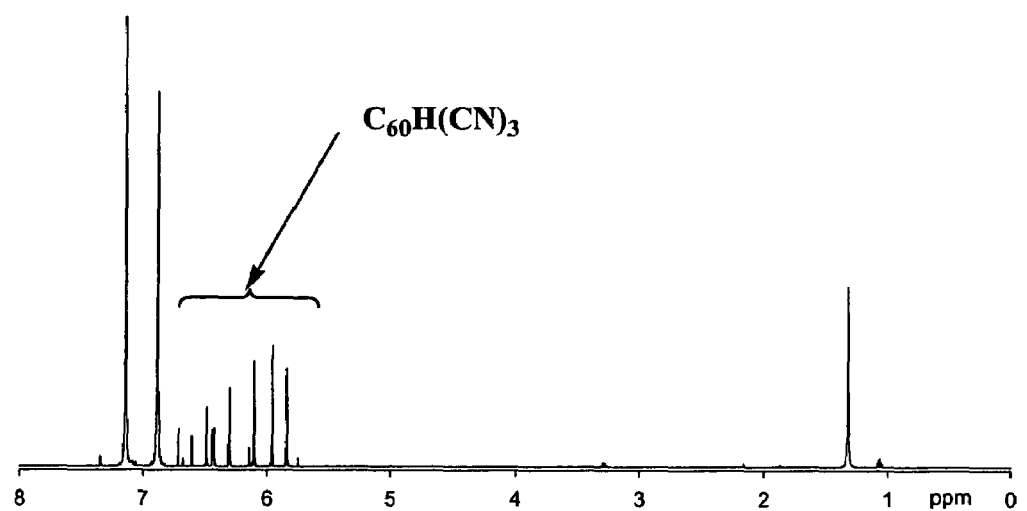

Characterization of $C_{60}H(CN)_3$ and $C_{60}(CN)_4$: $^1H$ NMR: By NMR, the characterization of $C_{60}H(CN)_3$ and $C_{60}(CN)_4$ are more difficult than for $C_{60}H(CN)$ and $C_{60}(CN)_2$ because they were obtained in the form of different regioisomers. As seen in FIG. 7A, the NMR $^1H$ spectrum of $C_{60}H(CN)$ gives one singlet at 6.65 ppm because there is only one isomer. In the case of $C_{60}H(CN)_3$ (see FIG. 7B), thirteen singlets appear between 5.8 and 6.5 ppm corresponding to the proton of each of the different regioisomers.

Figure 8:
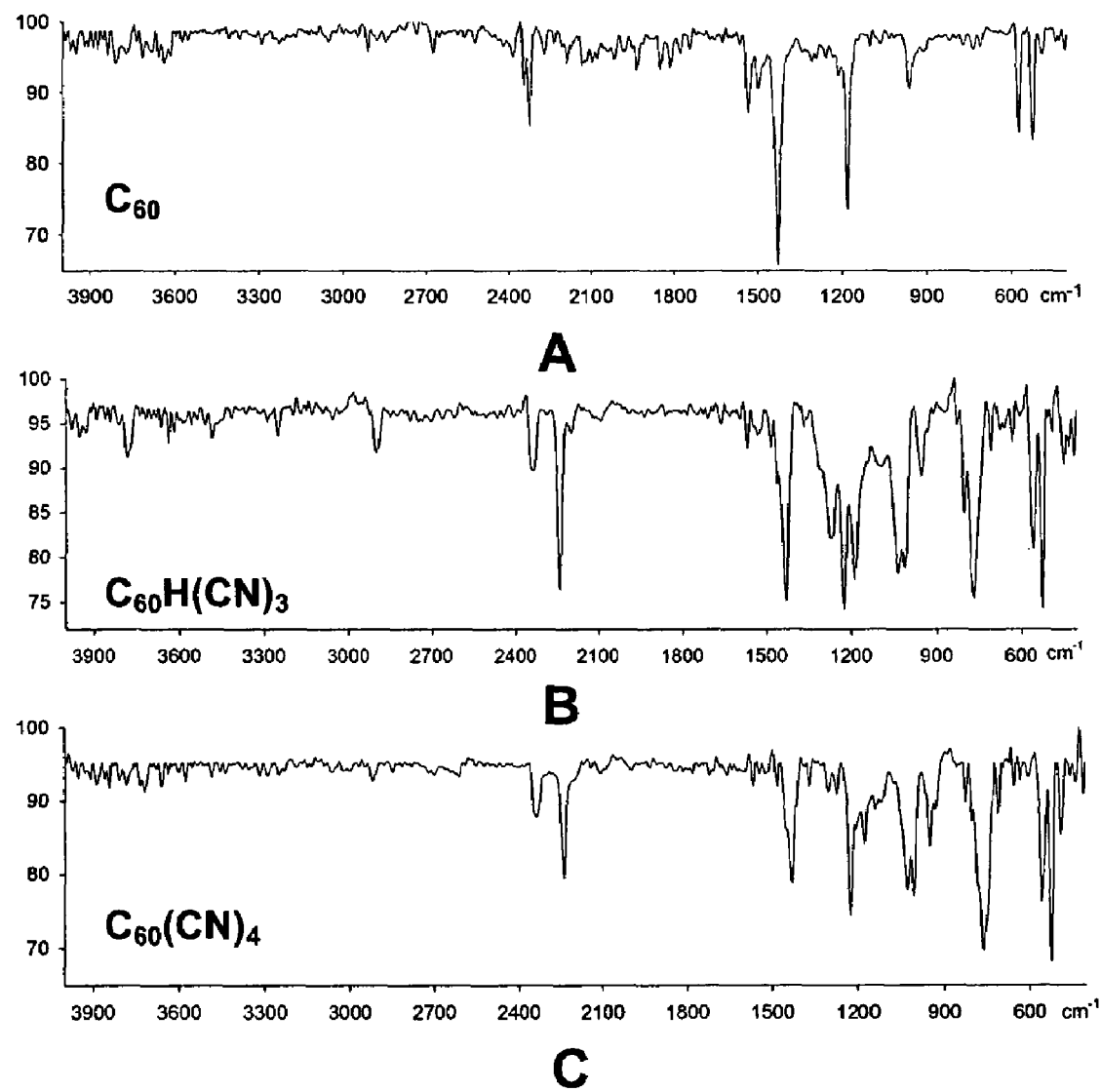

IR: As seen in FIG. 8, the drift IR spectra of $C_{60}H(CN)_3$ (FIG. 8B) and $C_{60}(CN)_4$ (FIG. 8C) show clearly the cyano group (2232 $cm^{-1}$) that does not appear for $C_{60}$ (1430, 1180, 540 and 525 $cm^{-1}$) (FIG. 8A).

Mass spectrum (not shown): The negative MALDI-TOF spectra of $C_{60}H(CN)_3$ and $C_{60}(CN)_4$ show mainly the parent peaks.

Results from differential pulse voltammetry measurements of subject compounds (not shown): As the number of cyano groups on the $C_{60}$ derivatives increased, it became easier to reduce the compounds. Hence, the attachment of four cyano groups causes a positive shift of 320 mV, compared to $C_{60}$. The hydro cyano fullerene derivatives compounds are not soluble in hydroxylic solvents (such as water, ammonia, acetic acid, ethanol, etc.), making a direct titration impossible. The method used in the literature to determinate the pKa of hydro fullerene(s) is through voltammety. In order to obtain information about the acidity of $C_{60}H(CN)_x$, different bases were added to solutions of these compounds. If the acidity of $C_{60}H(CN)_x$ was strong enough to protonate the base added and form $C_{60}(CN)_x^-$, the first reduction peak for $C_{60}H(CN)_x$ should decrease in height because $C_{60}(CN)_x^-$ is much more difficult to reduce, its first step of reduction being close to the second reduction step of $C_{60}H(CN)_x$. Four bases were used: the sodium salts of acetic acid, chloroacetic acid, dichloroacetic acid and trifluoroacetic acid. In water, the pKa values of the acids are 4.75, 2.87, 1.35 and 0.52, respectively. The addition of 1 mol of acetate or chloroacetate in DMSO per mol of $C_{60}H(CN)$ in ODCB resulted in complete disappearance of the first reduction peak of $C_{60}H(CN)$, signifying that $C_{60}H(CN)$ is a much stronger acid than chloroacetic acid. By contrast, addition of 1 equiv of sodium dichloroacetate caused only a 20% reduction in the height of the $C_{60}H(CN)$ peak and no decrease with added trifluoroacetate. This implies that the pKa of $C_{60}H(CN)$ is between chloroacetic acid (pKa: 2.87) and dichloroacetic acid (pKa: 1.35). The same experiments were performed with $C_{60}H(CN)_3$. For this compound, the addition of 1 mol of acetate, chloroacetate or dichloroacetate per mol of $C_{60}H(CN)_3$, resulted in complete disappearance of the first reduction peak of $C_{60}H(CN)_3$, signifying that $C_{60}H(CN)_3$ is a much stronger acid than dichloroacetic acid (pKa: 1.35) but less than trifluoroacetic acid (pKa: 0.52) since only half of the $C_{60}H(CN)_3$ reduction peak disappeared. Thus, $C_{60}H(CN)_3$ (pKa around 0.7) is a much stronger acid than $C_{60}H(CN)$ (pKa around 2.5).

Example 2

Preparation of the Mixing Agent (Poly(ethylene Oxide) Attached Fullerenes)

Poly(ethylene oxide) monomethyl ethers (for example, where n~3, 8, 12, 17, and 45) were functionalized with benzyl bromide in three steps as shown immediately below in Scheme 1:

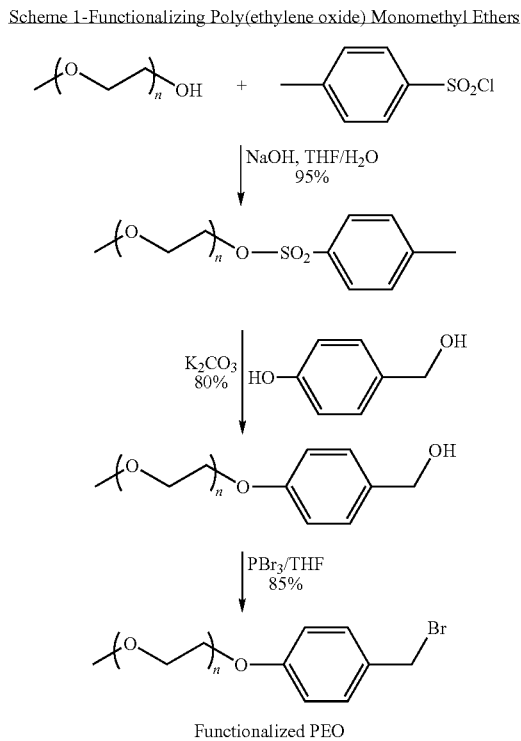

Scheme 1-Functionalizing Poly(ethylene oxide) Monomethyl Ethers

Functionalized PEO

As seen in FIG. 5, in the ATRA step, the fullerene was first dissolved in o-dichlorobenzene (ODCB) in a pressure vessel, then 8 equivalents of PEO-benzylbromide (one equivalent yields a mono-PEO final product and the like) and 2,2'-bipyridine were added and the solution was degassed for 10 minutes. After 8 equivalents of Cu(I)Br was added, the vessel was sealed and heated to 110° C. for 24 h until a green precipitate formed. Air was bubbled through the reaction mixture to precipitate un-reacted copper (I) complex. Upon filtration, the solution was concentrated and precipitated into 200 ml of ether. The product, with "n" final PEO chains and "y" bromines, was collected by filtration as a brown oil or solid (final yield was ~90%).

The proposed mechanism for the reaction is presented in FIG. 9.

$^1$H-NMR spectra of multi-PEO fullerenes in $CDCl_3$ (FIG. 10) give very broad signals, no signal of fullerene carbon was observed from $^{13}$C-NMR spectra. Both indicates the existence of radicals and (or) random additions of PEG chains to fullerene molecules.

As seen in FIGS. 11A and 11B, two types of radicals were discovered from EPR study of $(PEO_3)_mC_{60}$ solid and solution samples. The results indicate that some $(PEO_3)_mC_{60}$ molecules (<1% from calculation) have radicals and small amount of Cu(II) residue still left in the sample (both organic (FIG. 11A) and transitional metal (FIG. 11B) radical signals).

TABLE 1

| Elemental analysis result of $(PEO_3)_mC_{60}$ | | | | |
|---|---|---|---|---|
| Sample ID | % C | % H | % Br | % Cu |
| C60TEGN | 72.82 | 5.64 | 1.57 | 0.79 |

Elemental analysis of $(PEO_3)_mC_{60}$ (Table 1, above) confirmed the existence of Br and Cu(II) residues. Calculation based on the ratio of H gives 5 $PEO_3$ chains attached to each fullerene molecule by average, which is confirmed by MALDI spectrum of $(PEO_3)_mC_{60}$ (see FIG. 12 with $(PEO_3)_mC_{60}$ (FIG. 12A) and $(PEO_8)_mC_{60}$ (FIG. 12B)). When longer PEO chains were used in the reaction, fewer numbers of PEOs were reacted to each fullerene molecule probably due to the steric hindrance. To further remove the Cu(II) residue, $(PEO_3)_mC_{60}$ was dissolved in $CHCl_3$ and bubbled with $H_2S$ for 4 hours. After this process, the Cu(II) EPR signal disappeared and the fullerene radical signal had no change.

One can see from the MALDI data of $(PEO_3)_mC_{60}$ (FIG. 12A) and $(PEO_8)_mC_{60}$ (FIG. 12B) that m is ranged from 1 to 8, with an average number about 4 to 5. From the elemental analysis of $(PEO_3)_mC_{60}$, there is 1.6% bromine, which equals about 0.4 bromine (or y~0.4) per PEO fullerene, on average. The existence of bromine can be explained by the reactions mechanism (FIG. 9), when a PEO-benzyl radical (compound 2) reacted with a fullerene double bond, a fullerene radical (compound 3) formed. This fullerene radical reacted with either another PEO-benzyl radical to give compound 5 or reversible abstracted bromine from the copper complex (or perhaps compound 1) to give compound 4. Again, any possible bromine is not shown in FIG. 3 since the bromine had no obvious effect on the final PCMs.

Specifically, the exemplary azide addition fullerenes or $C_{60}\{(NCH_2CH_2O)_nCH_3\}_m$ molecules, made with various length of PEO chains, were synthesized by azide addition of PEO-azide to fullerene (as seen in FIG. 6). As indicated above, the synthesis followed the procedure from literature. [Hawker, C. J., Saville, P. M., and White, J. W., *J. Org. Chem.* 1994, 59, 3503 and Huang, X. D., Goh, S. H., and Lee, S. Y., *Macromol. Chem. Phys.* 2000, 201, 2660.] Once again, unlike those fullerene azide addition reactions, in which mono-azide addition products are always the major products, here we found bis-azide addition products (compounds 5 in FIG. 6 or the Di PEOC$_{60}$ with n=8, 11, 16, and 45 seen FIG. 2) were the major products in all the reactions. Only trace amount of mono-azide addition products (compounds 4 in FIG. 6 or the Mono PEOC$_{60}$ with n=8, 11, 16, and 45 seen FIG. 2) were detected. The structure of compounds 4 and 5 were confirmed by $^1$H-NMR, $^{13}$C-NMR and elemental analysis. DSC and TGA studies showed that these materials are thermally stable up to 220° C.

The bis-azide addition fullerenes are very soluble in common organic solvents such as toluene, methylene chloride, chloroform, THF and methanol. Di (PEO$_{16}$)C$_{60}$ and Di (PEO$_{45}$)C$_{60}$ are soluble in water. UV-VIS spectra of Di (PEO$_{16}$)C$_{60}$ in various solvents and thin film are shown in FIG. 13. The large shifts of UV absorption in different solvents strongly indicate aggregation of these molecules.

Example 3

Membrane/Film Preparation

1. Appropriate amounts of the C$_{60}$(CN)$_3$H (it is noted that any hydrogen cyano fullerene may be used for the exemplary C$_{60}$(CN)$_3$H proton-source agent) and, if desired, PEO$_m$C$_{60}$ (mixing agent) were weighed and added to ~5 g of Chlorobenzene.

2. Required amount of any desired PEO (host polymer) was added to ~5 g of chlorobenzene in a separate container.

3. These mixtures were sonicated (~10 mins).

4. They were then stirred in an 85° C. oil bath for 1~2 hours.

5. After confirming complete dissolution, they were mixed together and stirred for about 1 hour at 85° C. in an oil bath. (PEO tends to gel if the mixing in the earlier stages is not proper.)

6. The resultant homogeneous solution was poured into a TEFLON dish and dried in a 120° C. oven for 2~3 hours to get a composite film.

Example 4

Conductivity/Impedance Analysis

An HP LF4192A Impedance Analyzer was used to measure impedance (conductivity). Samples were scanned at frequencies from 0.5 Hz to 11 MHz. The high frequency impedance at zero phase angle was used as the impedance value. For each sample, the polymer film was mounted in a TEFLON fixture having windows for equilibrating with the surrounding atmosphere. The sample films were equilibrated at the required humidity for ~12 hours. The various humidities were achieved by saturated salt solutions of various appropriate salts. Each resulted in a different humidity in the head space above the solution (a standard technique that is well known in the art). Each sample was suspended (in the TEFLON fixture) above these salt solutions and measured after equilibration. All measurements were two-probe measurements. For the samples, all were at room temperature (i.e. ~22° C.) and an appropriate humidity (most commonly, humidity was ~15-17% RH, but other RHs were utilized for some experiments). The conductivity was calculated from the impedance as seen in Equation 1, immediately below.

Conductivity[$S$/cm]=(1/$R$)*($L$/$A$)    Equation 1

Equation 1: R [Ohms]=high frequency zero phase angle resistance; L [cm]=length of the conducting film; and A [square cm]=cross sectional area of the conducting film (product of width and thickness of the film for in-plane measurements).

Example 5

First PCM Creation and Analysis Experiments

A specific PCM was prepared (see details above) by mixing poly(ethylene oxide) (70 wt %), hydrogen tri-cyano fullerene (20 wt %), and multiple PEO C$_{60}$ (in which n=3 and m=5 in FIG. 3) (10 wt %) altogether and through solution casting. Then, the proton conductivity was measured at 30° C. under 20% relative humidity. Similarly, the conductivity of NAFION 117 was also measured as a control. Table 2 summarizes the results.

TABLE 2

Proton Conductivities of PCMs made with the Hydrogen Cyano Fullerene/Poly(ethylene oxide)/Multiple PEO C$_{60}$ (Subject Sample) versus NAFION 117.

| Subject Sample σ, S cm$^{-1}$ | NAFION 117 σ, S cm$^{-1}$ |
|---|---|
| $6 \times 10^{-2}$ | $1 \times 10^{-3}$ |

The results (Table 2, above) show more than an order of magnitude higher conductivity for the subject PCM than with the industrial standard NAFION 117 PCM, the control. Additionally, the results shown in Table 2 demonstrate the ability of C$_{60}$H(CN)$_3$ to impart conductivity to a non-conducting polymer, such as PEO.

REFERENCES

Fontanella, J. J.; Wintersgill, M. C.; Wainright, J. S.; Savinell, R. F.; Litt, M. *Electrochimica Acta* 1998, 43, 1289.

Haile, S. M.; Boysen, D. A.; Chisholm, C. R. I.; Merle, R. B. *Nature (London, United Kingdom)* 2001, 410, 910.

Hawker, C. J., Saville, P. M., and White, J. W., *J. Org. Chem.* 1994, 59, 3503.

Herring, A. M.; Turner, J. A.; Dec, S. F.; Sweikart, M. A.; Malers, J. L.; Meng, F.; Pern, J.; Horan, J.; Vernon, D. *Abst 228th Am. Chem. Soc. National Meeting*, Philadelphia, Pa., Aug. 22-26, 2004 FUEL-053.

Hinokuma, K., Ata, M., J. Electrochem. Soc. 150 (2003) A112.

Huang, X. D., Goh, S. H., and Lee, S. Y., *Macromol. Chem. Phys.* 2000, 201, 2660.

Katsoulis, D. E. Chem. Rev. 1998, 98, 359.

Keshavarz, M., Knight, Srdanov, G, and Wudl F., *JACS* 1995, 11371.

Kim, Y. S.; Dong, L.; Hickner, M. A.; Glass, T. E.; Webb, V.; McGrath, J. E. *Macromolecules* 2003, 36, 6281.

Kim, Y. S.; Wang, F.; Hickner, M.; Zawodzinski, T. A.; McGrath, J. E. *J. Membr. Sci.* 2003, 212, 263.

Kreuer, K. D.; Fuchs, A.; Ise, M.; Spaeth, Maier, M. J. *Electrochim. Acta* 1998, 43, 1281.

Mathias, M.; Gasteiger, H.; Makharia, R.; Kocha, S.; Fuller, T.; Xie, T.; Pisco, J. *Preprints of Symposia—American Chemical Society, Division of Fuel Chemistry* 2004, 49(2), 471-474.

Saab, A. P.; Stucky, G. D.; Passerini, S.; Smyrl, W, H, *Fullerene Science and Technology,* 1998, 6, 227.

Schuster, M. F. H.; Meyer, W. H.; Schuster, M.; Kreuer, K. D. *Chem. Mater.* 2004, 16, 329.

Shao, Z-G.; Joghee, P.; Hsing, I-M. *J. Membr. Sci.* 2004, 229, 43.

Tchatchoua, C.; Harrison, W.; Einsla, B.; Sankir, M.; Kim, Y. S.; Pivovar, B.; McGrath, J. E., *Preprints of Symposia—Am. Chem. Soc., Div. of Fuel Chem.* 2004, 49(2), 601.

Thomas, B. H.; Shafer, G.; Ma, J. J.; Tu, M.-H.; DesMarteau, D. D. *J. Fluorine Chem.* 2004, 125(8), 1231-1240.

Wang, F.; Hickner, M.; Kim, Y. S.; Zawodzinski, T. A.; McGrath, J. E. *J. Membr. Sci.* 2002, 197, 231.

Zhang, H.; Chen, R.; Ramanathan, L. S.; Scanlon, E.; Xiao, L.; Choe, E-W.; Benicewicz, B. C. *Prep. Div. Fuel Cehm. Am. Chem. Soc.*, Philadelphia, Pa., Aug. 22-26, 2004, 49, 588.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a composition or method to address each and every problem sought to be solved by the present invention, for it to be encompassed by the present claims. Furthermore, no element, composition, or method step in the present disclosure is intended to be dedicated to the public regardless of whether the element, composition, or method step is explicitly recited in the claims. No claim element herein is to be construed under the provisions of 35 U.S.C. 112, sixth paragraph, unless the element is expressly recited using the phrase "means for."

What is claimed is:

1. A proton conducting membrane (PCM) comprising a host polymer and a proton-source agent comprising a carbon cluster derivative, wherein said carbon cluster is derivatized with both a hydrogen and a cyano moiety and the PCM further comprises a mixing agent to promote blending of said carbon cluster derivative with said host polymer, wherein said mixing agent comprises a poly(ethylene oxide) attached carbon cluster.

2. A PCM according to claim 1, wherein said carbon cluster comprises a fullerene.

3. A proton conducting membrane (PCM) comprising a host polymer and a proton-source agent comprising a carbon cluster derivative, wherein said carbon cluster is derivatized with both a hydrogen and a plurality of cyano moieties and the PCM further comprises a mixing agent to promote blending of said carbon cluster derivative with said host polymer, wherein said mixing agent comprises a poly(ethylene oxide) attached carbon cluster.

4. A PCM according to claim 3, wherein said carbon cluster comprises a fullerene.

5. A proton conducting membrane (PCM) comprising:
   a) a host polymer;
   b) a proton-source agent comprising a carbon cluster derivative, wherein said carbon cluster is derivatized with both hydrogen and cyano moieties; and
   c) a mixing agent, wherein said mixing agent comprises a poly(ethylene oxide) attached carbon cluster.

6. A mixing agent according to claim 5, wherein said carbon cluster is a fullerene.

7. A mixing agent according to claim 5, wherein said poly(ethylene oxide) attached carbon cluster is selected from a group consisting of $C_{60}\{(NCH_2CH_2O)_nCH_3\}_m$ and $C_{60}\{CH_2C_6H_4O(CH_2CH_2O)_nCH_3\}_m$, wherein "n" and "m" range from 1 to about 45 and from 1 to about 8, respectively.

* * * * *